(12) United States Patent
Whang et al.

(10) Patent No.: US 7,292,644 B2
(45) Date of Patent: Nov. 6, 2007

(54) APPARATUS AND METHOD FOR GENERATING SPACE-TIME TRELLIS CODE FOR MAXIMIZING SPACE-TIME DIVERSITY GAIN AND CODING GAIN IN A MOBILE COMMUNICATION SYSTEM

(75) Inventors: Keum-Chan Whang, Seoul (KR); Chan-Soo Hwang, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 749 days.

(21) Appl. No.: 10/630,215

(22) Filed: Jul. 30, 2003

(65) Prior Publication Data
US 2004/0223555 A1    Nov. 11, 2004

Related U.S. Application Data

(60) Provisional application No. 60/469,251, filed on May 9, 2003.

(51) Int. Cl.
H04B 7/02    (2006.01)
(52) U.S. Cl. ............... 375/267; 375/265; 375/259
(58) Field of Classification Search ........ 375/259, 375/260, 295, 262, 265, 341, 267, 299, 347
See application file for complete search history.

(56) References Cited

U.S. PATENT DOCUMENTS

| | | | |
|---|---|---|---|
| 6,560,295 B1 * | 5/2003 | Hammons et al. ........ | 375/299 |
| 6,614,861 B1 * | 9/2003 | Terry et al. ............. | 375/347 |
| 2005/0201481 A1 * | 9/2005 | Calderbank et al. ...... | 375/265 |

OTHER PUBLICATIONS

Ezio Biglieri, Dariush Divsalar, Peter J. McLane and Marvin K. Simon; "Introduction to Trellis-Coded Modulation with Application"; Mar. 1995; pp. 121-125.

(Continued)

*Primary Examiner*—Chieh M. Fan
*Assistant Examiner*—Julia P Tu
(74) *Attorney, Agent, or Firm*—The Farrell Law Firm, P.C.

(57) ABSTRACT

Disclosed is a method for generating a space-time trellis code (STTC) for maximizing space-time diversity gain and coding gain in a mobile communication system including at least two transmission antennas and generating a second number of STTC codes with an information data bit stream upon receiving the information data bit stream comprised of a first number of bits. The method comprises calculating a minimum effective length for each of the STTC codes; calculating product distances between all STTC codes having the same length as the minimum effective length, wherein for each of pairs of all initial states and all end states for each of the STTC codes, initial states are identical to end states; summing reciprocals of product distances between all the STTC codes for each of the STTC codes, and calculating minimum average product distances by determining a reciprocal of the summation result; and selecting an STTC code corresponding to a minimum average product distance having a maximum value among the minimum average product distances as an STTC code corresponding to the information data bit stream.

10 Claims, 7 Drawing Sheets

OTHER PUBLICATIONS

Vahid Tarokh, Nambi Seshadri, A.R. Claderbank; "Space-Time Codes for High Data Rate Wireless Communication: Performance Criterion and Code Construction"; Mar. 1998; IEEE Transactions on Information Theory, vol. 44, No. 2; pp. 744-765.

Abbas Yougacoglu, Mohamed Siala; "Space-Time Codes for Fading Channels"; IEEE 1999; pp. 2495-2499.

Welly Firmanto, Branka S, Vucetic, Jinhong Yuan; "Space-Time TCM with Improved Performance on Fast Fading Channels"; Apr. 2001; IEEE Communications Letters, vol. 5, No. 4; pp. 154-156.

* cited by examiner

| Code | $\delta_{min}$ | $pd_{min}$ | $pd_{min.avg}$ | Coding gain over Tarokh |
|---|---|---|---|---|
| Tarokh | 2 | 4 | 1.77 | 0 dB |
| Firmanto | 2 | 24 | 8.73 | 3.47 dB |
| Ungerboeck with STBC | 2 | 16 | 16.00 | 4.78 dB |
| Divsalar with STBC | 4 | 16 | 7.76 | – |

4state

00 12 20 32
02 10 22 30
23 31 03 11
21 33 01 13

4-PSK Constellation

FIG.5

8state 00 20 12 32
01 21 13 33
22 02 30 10
23 03 31 11
02 22 10 30
03 23 11 31
20 00 32 12
21 01 33 13

| STTC | | Effective length | Minimum product distance | Minimum average product distance |
|---|---|---|---|---|
| 4-STATE | Tarokh | 2 | 4 | 1.77 |
| | Firmanto | 2 | 24 | 8.73 |
| | INVENTION | 2 | 24 | 9 |
| 8-STATE | Tarokh | 2 | 16 | 16 |
| | Firmanto | 2 | 48 | 48 |
| | INVENTION | 2 | 48 | 48 |
| 16-STATE | Tarokh | 3 | 16 | 2.67 |
| | Firmanto | 3 | 64 | 7.38 |
| | INVENTION | 3 | 64 | 11.37 |

APPARATUS AND METHOD FOR GENERATING SPACE-TIME TRELLIS CODE FOR MAXIMIZING SPACE-TIME DIVERSITY GAIN AND CODING GAIN IN A MOBILE COMMUNICATION SYSTEM

This application claims priority under 35 U.S.C. § 119 (e) to a provisional application entitled "Apparatus and Method for Generating Space-Time Trellis Code for Maximizing Space-Time Diversity Gain and Coding Gain in a Mobile Communication System" filed in the U.S. Patent and Trademark Office on May 9, 2003 and assigned Ser. No. 60/469,251, the contents of which are incorporated herein by reference.

BACKGROUND OF THE INVENTION

1. Field of the Invention

The present invention relates generally to an apparatus and method for generating a space-time trellis code (hereinafter referred to as "STTC") in a mobile communication system, and in particular, to an apparatus and method for generating STTC for maximizing space-time diversity gain and coding gain.

2. Description of the Related Art

Unlike a wired communication system, a mobile communication system based on a wireless communication system uses limited frequency resources. The wireless mobile communication system must use a multilevel modulation scheme in order to transmit information at high speed. In the multilevel modulation scheme, a data rate can be increased as the number of modulation levels is increased. Thus, the multilevel modulation scheme is advantageous in that high-speed information can be sent within a limited bandwidth. However, the multilevel modulation scheme, if it experiences a fading environment, has abrupt performance degradation. Generally, the mobile communication system is configured so that several mobile stations (MSs) communicate with one another via one base station (BS). However, in the mobile communication system, the phase of a received signal can become distorted due to a fading phenomenon occurring on a radio channel during high-speed data transmission. The fading reduces the amplitude of a received signal by several dB to several tens of dB. If a phase of a received signal distorted due to the fading phenomenon is not compensated for during data demodulation, the phase distortion becomes an information error cause of transmission data transmitted by a transmission side, causing a reduction in quality of a mobile communication service. Therefore, in order to transmit high-speed data without a decrease in the service quality, the mobile communication system must overcome fading, and various diversity techniques have been proposed to cope with performance degradation due to the fading.

Generally, a CDMA mobile communication system adopts a rake receiver that performs diversity reception by using delay spread of a channel. While the rake receiver applies reception diversity for receiving a multipath signal, a rake receiver applying the diversity technique using the delay spread is disadvantageous in that it does not operate when the delay spread is less than a preset value. In addition, a time diversity technique using interleaving and coding is used in a Doppler spread channel. However, the time diversity technique is disadvantageous in that it can hardly be used in a low-speed Doppler spread channel.

Therefore, in order to compensate for the fading, a space diversity technique is used in a channel with low delay spread, such as an indoor channel, and a channel with low-speed Doppler spread, such as a pedestrian channel. The space diversity technique uses two or more transmission/reception antennas. In this technique, when a signal transmitted via one transmission antenna decreases in its signal power due to fading, a signal transmitted via the other transmission antenna is received. The space diversity can be classified into a reception antenna diversity technique using a reception antenna and a transmission diversity technique using a transmission antenna. However, since the reception antenna diversity technique is applied to a mobile station, it is difficult to install a plurality of antennas in the mobile station in view of a size of the mobile station and its installation cost. Therefore, it is recommended that the transmission diversity technique should be used in which a plurality of transmission antennas are installed in a base station.

Particularly, in a $4^{th}$ generation mobile communication system, a data rate of about 10 Mbps to 150 Mbps is expected, and an error rate requires a bit error rate (hereinafter referred to as "BER") of $10^{-3}$ for voice, BER of $10^{-6}$ for data, and BER of $10^{-9}$ for image. The STTC is based on a combination of a multi-antenna technique and a channel coding technique, and is a technique bringing a drastic improvement of a data rate and reliability in a radio MIMO (Multi Input Multi Output) channel.

In addition, a space-time code (hereinafter referred to as "STC"), based on a combination of a multi-antenna scheme and a channel coding scheme, is a code capable of improving frequency efficiency and reliability in a radio environment. The STC allows a receiver to obtain space-time diversity gain by extending a transmission signal to a 2-dimensional area of time and space. In addition, a coding scheme using the STC, unlike the existing channel coding scheme, can obtain coding gain without additional extension of a bandwidth by accommodating redundancy generated due to coding in a space-time dimension, thereby contributing to a remarkable improvement in channel capacity.

The STTC, a kind of the STC, obtains a receiver's space-time diversity gain by extending a space-time dimension of a transmitter's transmission signal. In addition, the STTC can obtain coding gain without a supplemental bandwidth, contributing to a large improvement in channel capacity. Therefore, in the transmission diversity technique, the STTC is used. When the STTC is used, coding gain having an effect of amplifying transmission power is obtained together with diversity gain which is equivalent to a reduction in channel gain occurring due to a fading channel when the multiple transmission antennas are used. A method for transmitting a signal using the STTC is disclosed in Vahid Tarokh, N. Seshadri, and A. Calderbank, "Space Time Codes For High Data Rate Wireless Communication: Performance Criterion And Code Construction," IEEE Trans. on Info. Theory, 1998, 3, (2), pp. 744-765, the contents of which are incorporated herein by reference.

In the above reference, Vahid Tarokh has proposed a pairwise error rate of STTC in a fast Rayleigh fading environment, and STTC design criteria based on the pairwise error rate. Vahid Tarokh set a design criterion for coding gain among the STTC design criteria by a minimum product distance among all codewords corresponding to a minimum effective length. Thereafter, in a paper entitled "Space Time TCM With Improved Performance On Fast Fading Channel" submitted by Firmanto. W., Vucetic. B. S., and Yuan. J. (see Firmanto. W., Vucetic. B. S., Yuan. J., "Space Time TCM With Improved Performance On Fast Fading Channel," IEEE Commun. Lett., 2001, 4, (4), pp.

154-156), Firmanto has proposed STTC that optimally satisfies a minimum product distance design criterion of Vahid Tarokh. Afterward, in a paper entitled "Space Time Codes For Fading Channels" submitted by Yongacoclu. A., and Siala. M. (see Yongacoclu. A., Siala. M., "Space Time Codes For Fading Channels", Proc. VTC, Rhodes, Greece, 2001, pp 1132-1136), Yongacoclu has proposed a method of concatenating a space time block code (hereinafter referred to as "STBC") and an existing trellis code modulation (hereafter referred to as "TCM") scheme in order to maximize coding gain and diversity gain, and has asserted that the method of concatenating the STBC and the TCM scheme can obtain higher diversity gain and coding gain as compared with when only the STTC is used.

It will be assumed herein that in a mobile communication system using STC, a transmitter transmits a signal through two transmission antennas and a receiver receives a signal through one reception antenna. In such a mobile communication system, a signal received at a particular time t is represented by $$r_t = \sqrt{E_S} \sum_{i=1}^{2} h_t^i c_t^i + n_t \quad \text{Equation (1)}$$

In Equation (1), $r_t$ denotes a signal received at a particular time t, $h_t^i$ denotes a complex fading coefficient from an $i^{th}$ transmission antenna with mean zero and variance 0.5 per dimension, $E_S$ denotes energy per symbol, $c_t^i$ denotes a space-time coded symbol transmitted via an $i^{th}$ transmission antenna, and $n_t$ denotes a complex Gaussian noise with mean zero and variance $N_O/2$ per dimension.

A description will now be made of a comparison between a case where the method of concatenating STBC and a TCM scheme, proposed by Yongacoclu, is used and a case where only STTC is used in the mobile communication system sated above.

First, with reference to FIG. 1, a description will be made of the case where the method of concatenating STBC and a TCM scheme, proposed by Yongacoclu, is used in the mobile communication system.

Figure 1:
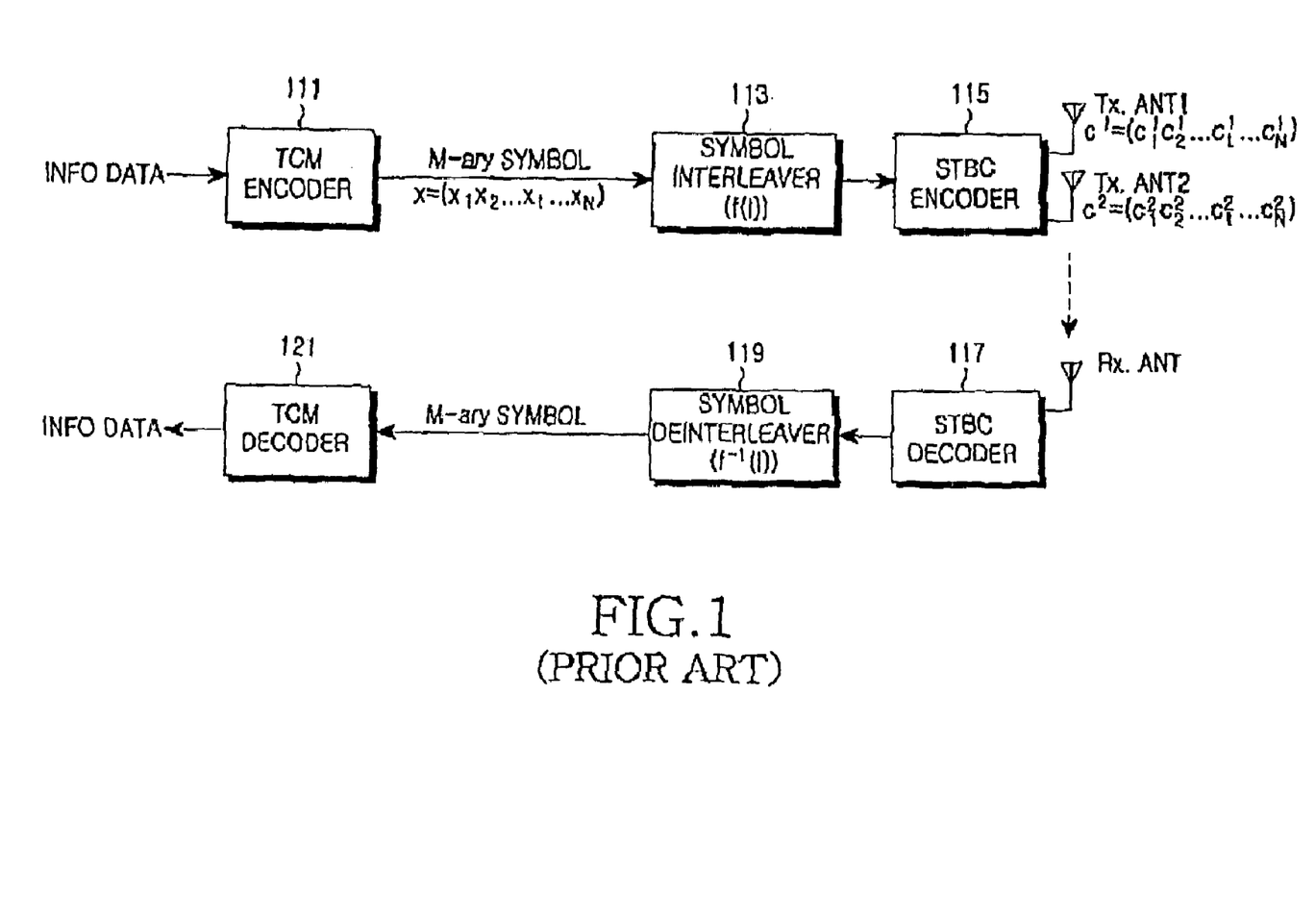
FIG. 1 is a block diagram illustrating a general transceiver structure of a mobile communication system using a method of concatenating STBC and TCM.

FIG. 1 is a block diagram illustrating a general transceiver structure of a mobile communication system using the method of concatenating STBC and a TCM scheme. Referring to FIG. 1, when information data bits are received, the information data bits are provided to a TCM encoder 111. Although a TCM scheme is used as an encoding scheme in FIG. 1, a multiple trellis coded modulation (hereinafter referred to as "MTCM") scheme can also be used as an encoding scheme. The TCM encoder 111 encodes the received information data bits in the TCM scheme, and then provides the encoding result to a symbol interleaver 113. Here, it is assumed that a signal output from the TCM encoder 111 is an M-ary symbol, and the M-ary symbol, i.e., a codeword, is $x=(x_1, x_2, \ldots, x_t, \ldots, x_1)$. The symbol interleaver 113 interleaves a codeword $x=(x_1, x_2, \ldots, x_t, \ldots, x_1)$ output from the TCM encoder 111 in a predetermined interleaving scheme, and then provides the interleaving result to an STBC encoder 115. A block size of the symbol interleaver 113 is N for a symbol duration, and is defined by the predetermined interleaving scheme, i.e., a mapping function f(t).

The STBC encoder 115 encodes a signal output from the symbol interleaver 113 into STBC, and then transmits the encoding result to a receiver through the two transmission antennas, i.e., a first transmission antenna Tx.ANT1 and a second transmission antenna Tx.ANT2. For example, when an output of the symbol interleaver 113 was $s_0 s_1$, the STBC encoder 115 encodes the $s_0 s_1$, into STBC, and outputs symbols $(s_0 s_1)$ and $(-s_1^*, s_0^*)$ as shown in Table 1 below.

TABLE 1

|       | Tx.ANT1   | Tx.ANT2 |
|-------|-----------|---------|
| t     | $s_0$     | $s_1$   |
| t + T | $-s_1^*$  | $s_0^*$ |

In Table 1, t represents a particular time, and t+T represents a time when a time T has passed since the particular time t.

Signals transmitted through the first transmission antenna Tx.ANT1 and the second transmission antenna Tx.ANT2 experience a radio channel environment. Therefore, as described in conjunction with Equation (1), both a channel that the signal transmitted via the first transmission antenna Tx.ANT1 experiences and a channel that the signal transmitted via the second transmission antenna Tx.ANT2 experiences have a complex fading coefficient $h_t^i$. It will be assumed that a complex fading coefficient $h_t^i$ of the channel that the signal transmitted via the first transmission antenna Tx.ANT1 experiences and a complex fading coefficient $h_t^i$ of the channel that the signal transmitted via the second transmission antenna Tx.ANT2 experiences have continuity between two consecutive symbols for STBC decoding, i.e., $h_{2n-1}^i = h_{2n}^i$.

Meanwhile, a receiver receives a signal transmitted by the transmitter through one reception antenna Rx.ANT, and the received signal is provided to an STBC de coder 117. The STBC decoder 117 decodes the received signal with STBC, and then provides the decoding result to a symbol deinterleaver 119. The symbol deinterleaver 119 deinterleaves a signal output from the STBC decoder 117 according to the interleaving scheme applied in the transmitter, and then provides the deinterleaving result to a TCM decoder 121. Since the interleaving scheme applied in the transmitter is a mapping function f(t), the symbol deinterleaver 119 deinterleaves the signal output from the STBC decoder 117 according to an inverse function, $f^1(t)$, of the mapping function f(t). The TCM decoder 121 decodes a signal output from the symbol deinterleaver 119 in a TCM scheme, and outputs information data bits. The TCM scheme is used as a decoding scheme, since it is assumed in FIG. 1 that the TCM scheme is used as an encoding scheme. However, an MTCM scheme can be used as the decoding scheme when the MTCM scheme is used as the encoding scheme.

If it is assumed that when the codeword $x=(x_1, x_2, \ldots, x_t, \ldots, x_1)$ is transmitted, a length of the codeword x is 1 and $x_t$ is a trellis coded symbol, then pairwise error probability that a maximum likelihood decoder can select a defective codeword $x'=(x_1', x_2', \ldots, x_t', \ldots, x_1')$ is represented by $$p_1(x \to x' \mid h^1, h^2) = \quad \text{Equation (2)}$$
$$\exp\left(-\frac{E_S}{4N_O} \sum_{t \in \eta} \left(|h_{f^{-1}(t)}^1|^2 + |h_{f^{-1}(t)}^2|^2\right)|x_t - x_t'|^2\right)$$

In Equation (2), $h^i$ is assumed as $h^i = (h_1^i h_2^i \ldots h_t^i \ldots h_N^i)$, and $\eta$ indicates a set of all 't's with $x_t \neq x_t'$. Generally, it is assumed that a codeword length 1 is set to a value much less than a block size N of an interleaver, i.e., the symbol interleaver 113, (1<<N), and for all 't's with t∈η, $|h_{f^{-1}(t)}^{1}|$ and $|h_{f^{-1}(t)}^{2}|$ are independent samples of Rayleigh distribution random variables on fast fading channels. If an average of Equation (2) is calculated through a probability density function (PDF) of $h^1$ and $h^2$, the pairwise error probability is represented by $$p_1(x \to x') \le \prod_{t \in \eta} \left(1 + \frac{E_S}{4N_O}|x_t - x'_t|^2\right)^{-2} \qquad \text{Equation (3)}$$

$$\le \prod_{t \in \eta} \left(\frac{E_S}{4N_O}|x_t - x'_t|^2\right)^{-2}$$

Secondly, a description will be made of the case where STTC is used in the mobile communication system.

Unlike when the STBC is concatenated with the TCM scheme, when the STTC is used, STTC encoding is performed so the $c^i_t$ is an STTC coded symbol. If a codeword c=($c_1, c_2, \ldots, c_t, \ldots, c_1$) is transmitted and it is assumed that $c_t = c^1_t c^2_t$, then pairwise error probability that a maximum likelihood decoder can select a defective codeword c'=($c_1', c_2', \ldots, c_t', \ldots, c_1'$) is represented by $$p_1(c \to c') \le \prod_{t \in \eta} \left(\frac{E_S}{4N_O}\|c_t - c'_t\|^2\right)^{-1} \qquad \text{Equation (4)}$$

In Equation (4), η represents all 't's with $\|c_t - c'_t\| \ne 0$.

As described above, the result asserted by Yongacoclu is equal to the result obtained through simulation of a Monte-Carlo technique, and there is not enough theoretical basis regarding that the method of concatenating STBC and a TCM scheme affects which parameter among system parameters, thus improving performance. According to the minimum product distance design criterion actually proposed by Vahid Tarokh, the method proposed by Yongacoclu cannot explain a performance difference between STTCs. Accordingly, there is a demand for an STTC generation method for achieving both diversity gain and coding gain even in a fast fading environment.

SUMMARY OF THE INVENTION

It is, therefore, an object of the present invention to provide an STTC generation apparatus and method for maximizing diversity gain and coding gain in a mobile communication system.

It is another object of the present invention to provide an STTC generation apparatus and method which is robust against a Rayleigh fading environment in a mobile communication system.

It is further another object of the present invention to provide an STTC generation apparatus and method for increasing coding gain in a mobile communication system.

To achieve the above and other objects, the invention provides an apparatus for generating a space-time trellis code (STTC) for maximizing space-time diversity gain and coding gain in a mobile communication system including two transmission antennas and generating a second number of STTC codes with an information data bit stream upon receiving the information data bit stream comprised of a first number of bits. The apparatus comprises a controller for calculating a minimum effective length for each of the STTC codes, calculating product distances between all STTC codes having the same length as the minimum effective length, wherein for each of pairs of all initial states and all end states for each of the STTC codes, initial states are identical to end states, summing up reciprocals of product distances between all the STTC codes for each of the STTC codes, calculating minimum average product distances by taking a reciprocal of the summation result value, and generating an STTC code corresponding to a minimum average product distance having a maximum value among the minimum average product distances as an STTC code corresponding to the information data bit stream; and an STTC encoder for receiving the information data bit stream and generating an STTC code corresponding to the minimum average product distance as an STTC code of the information data bit stream under the control of the controller.

To achieve the above and other objects, the invention provides a method for generating a space-time trellis code (STTC) for maximizing space-time diversity gain and coding gain in a mobile communication system including two transmission antennas and generating a second number of STTC codes with an information data bit stream upon receiving the information data bit stream comprised of a first number of bits. The method comprises calculating a minimum effective length for each of the STTC codes; calculating product distances between all STTC codes having the same length as the minimum effective length, wherein for each of pairs of all initial states and all end states for each of the STTC codes, initial states are identical to end states; summing up reciprocals of product distances between all the STTC codes for each of the STTC codes, and calculating minimum average product distances by taking a reciprocal of the summation result value; and selecting an STTC code corresponding to a minimum average product distance having a maximum value among the minimum average product distances as an STTC code corresponding to the information data bit stream.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Several preferred embodiments of the present invention will now be described in detail with reference to the annexed drawings. In the following description, a detailed description of known functions and configurations incorporated herein has been omitted for conciseness.

First, a brief description will be made of a method for generating a space-time trellis code (hereinafter referred to as "STTC") according to the present invention.

As described in the related art section, a paper entitled "Space Time Codes For High Data Rate Wireless Communication: Performance Criterion And Code Construction," submitted by Vahid Tarokh, N. Seshadri, and A. Calderbank (see (Vahid Tarokh, N. Seshadri, and A. Calderbank, "Space Time Codes For High Data Rate Wireless Communication: Performance Criterion And Code Construction," IEEE Trans. on Info. Theory, 1998, 3, (2), pp. 744-765) discloses that a minimum product distance $pd_{min}$ must be maximized in order to achieve high coding gain in fast fading channels. Since a decoding error is affected not only by the minimum product distance but also by the number of shortest error event paths, an error probability $p_e$ that an error will occur in a maximum likelihood decoder is represented by $$p_e \leq \sum_{1} \sum_{c} p_1(c \to c')$$

$$= \sum_{\delta} \left(\frac{E_S}{4N_O}\right)^{-\delta} pd_{\delta,avg}^{-1}$$

$$\approx \left(\frac{E_S}{4N_O}\right)^{-\delta min} pd_{min,avg}^{-1}$$

Equation (5)

In Equation (5), $\delta$ represents an effective length defined as the number of time instances of two different codewords, i.e., c and c', and $pd_{\delta,avg}$ represents an average product distance considering all incorrect paths having the same effective length $\delta$. Further, $pd_{min,avg}^{-1}$ in Equation (5) can be expressed as $$pd_{min,avg}^{-1} = \sum_{all\ incorect\ path\ of\ \delta} \prod_{t\in\eta} |x_t - x_t'|^{-4}$$

Equation (6)

(when *STBC* concatenated with *TCM* or *MTCM* is used)

$$= \sum_{all\ incorrect\ path\ of\ \delta} \prod_{t\in\eta} |c_t - c_t'|^{-4}$$

(when *STTC* is used)

As illustrated in Equation (6), $pd_{min,avg}^{-1}$ calculated for the case where a space time block code (hereinafter referred to as "STBC") concatenated with a trellis coded modulation (hereinafter referred to as "TCM") scheme or a multiple trellis coded modulation (hereinafter referred to as "MTCM") scheme is used is different from $pd_{min,avg}^{-1}$ calculated for the case where only STTC is used. The minimum average product distance $pd_{min,avg}$ of Equation (5) can be calculated using Equation (6) above, and is used as an important parameter for an error probability at a relatively high energy-to-noise ratio per symbol $E_S/N_O$. In Equation (5), the minimum effective length $\delta_{min}$ and the minimum average product distance $pd_{min,avg}$ determine diversity gain and coding gain of space-time codes (hereinafter referred to as "STC"), respectively. When the minimum effective length $\delta_{min}$ is increased, an error probability is decreased, and when a given minimum effective length $\delta_{min}$ and a given minimum average product distance $pd_{min,avg}$ are maximized, the coding gain is also maximized.

As a result, the present invention proposes an STTC generation method for achieving both diversity gain and coding gain in a fast Rayleigh fading environment, and the STTC generation method proposed in the present invention is a method for generating an STTC codeword having a minimum average product distance by taking the summation of the reciprocals of the product distances, for all codewords corresponding to a predetermined minimum effective length.

A method for generating STTC according to the present invention will now be described with reference to the accompanying drawings.

Figure 2:
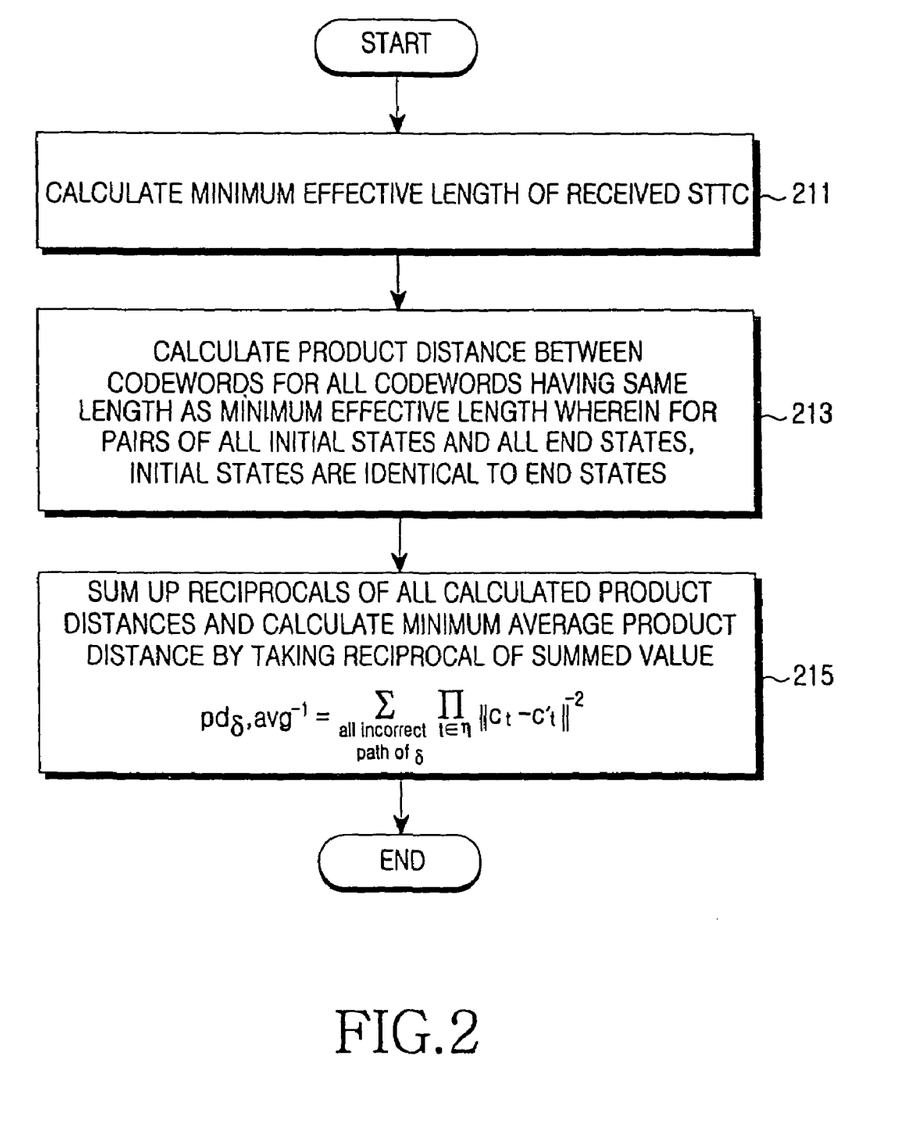
FIG. 2 is a flowchart illustrating a procedure for determining a design criterion for STTC generation according to an embodiment of the present invention.

FIG. 2 is a flowchart illustrating a procedure for determining a design criterion for STTC generation according to an embodiment of the present invention. Referring to FIG. 2, in step 211, when a particular STTC is received, a controller (not shown) calculates a minimum effective length of the received STTC, and then proceeds to step 213. The controller is so constructed as to control an operation of generating STTC in the mobile communication system. In step 213, the controller considers all codewords having the same length as the minimum effective length, wherein for pairs of all initial states and all end states available in the received STTC, initial states are identical to end states, calculates a product distance between codewords in all the codewords, and then proceeds to step 215. In step 215, the controller sums up the reciprocals of all the calculated product distances, calculates a minimum average product distance by taking a reciprocal of the summed value, and then ends the procedure. Here, the minimum average product distance is represented by $$pd_{\delta,avg}^{-1} == \sum_{all\ incorrect\ path\ of\ \delta} \prod_{t\in\eta} \|c_t - c_t'\|^{-2}$$

Equation (7)

Though not illustrated in the drawing, there is provided an STTC encoder for actually generating the selected STTC by encoding input information data bits under the control of the controller. That is, the STTC encoder encodes input information data bits into a corresponding STTC under the control of the controller.

Next, with reference to FIG. 3, a comparison will be made between performance parameters for the case where the STTC design criterion of the invention is applied and performance parameters for the case where the STTC design criterion is not applied.

Figure 3:
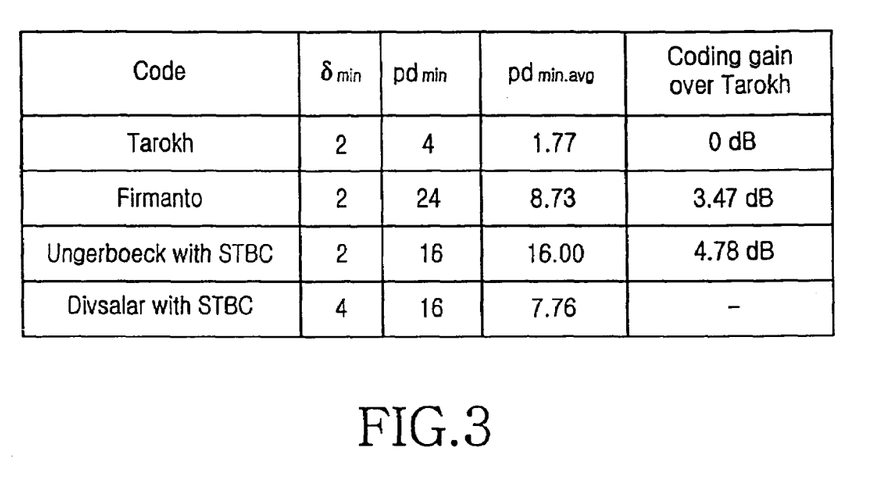
FIG. 3 is a table illustrating STTC performance parameters for the case where the STTC design criterion of the invention is applied and for the case where the STTC design criterion is not applied.

FIG. 3 is a table illustrating STTC performance parameters for the case where the STTC design criterion of the invention is applied and performance parameters for the case where the STTC design criterion is not applied. Prior to a description of FIG. 3, it will be assumed that 4-state, 8-PSK (Phase Shift Keying) signal-constellated TCM codes and MTCM codes are used as codes concatenated with STBC for spectrum efficiency of 2 bit/s/Hz, as disclosed in a paper entitled "Introduction To Trellis-coded Modulation With Application" submitted by Ungerboeck and Divsalar Biglieri. E, Divsalar. D, and Mclane. P .J (see Biglieri. E, Divsalar. D, Mclane. P .J: "Introduction To Trellis-coded Modulation With Application" (Macmillan, N.Y., 1991). The "TCM code" refers to a code generated in a TCM scheme, and likewise, the "MTCM code" refers to a code generated in an MTCM scheme. In addition, the TCM code and MTCM code proposed by Ungerboeck and Divsalar have the same state and spectrum efficiency as the STTC proposed by Tarokh and Firmanto. Shown in FIG. 3 are a minimum effective length $\delta_{min}$ and a minimum average product distance $pd_{min,avg}$ of STCs. The TCM code and MTCM code each have parallel paths in their trellis structure, so they have shortest error event paths, the number of which is less than the number of shortest error event paths of the STTCs. For example, although a minimum product distance ($pd_{min}$=16) of a code obtained by concatenating an Ungerboeck code, i.e., TCM code, with STBC, is shorter than a minimum product distance ($pd_{min}$=24) of the STTC proposed by Firmanto, the code generated by concatenation of the Ungerboeck code and the STBC has only one incorrect path at the minimum effective length. Therefore, the minimum average product distance $pd_{min,avg}$, like the minimum product distance $pd_{min}$, becomes 16. On the other hand, the STTC proposed by Firmanto has 3 incorrect paths having minimum product distances $pd_{min}$ of 24, 24 and 32, so a minimum average product distance $pd_{min,avg}$ becomes 8.73. Therefore, although a code generated by concatenation of the Ungerboeck code and the STBC has a shorter minimum product distance $pd_{min}$, it has better performance since it has a longer minimum average product distance $pd_{min,avg}$ compared with the STTC proposed by Firnanto and the STTC proposed by Tarokh.

That is, as shown in FIG. 3, for the STTC proposed by Tarokh, a minimum effective length $\delta_{min}$ is 2, a minimum product distance $pd_{min}$ is 4, and a minimum average product distance $pd_{min,avg}$ is 1.77. For the STTC proposed by Firmanto, a minimum effective length $\delta_{min}$ is 2, a minimum product distance $pd_{min}$ is 24, and a minimum average product distance $pd_{min,avg}$ is 8.73. For the code obtained by concatenation of an Ungerboeck code and STBC, a minimum effective length $\delta_{min}$ is 2, a minimum product distance $pd_{min}$ is 16, and a minimum average product distance $pd_{min,avg}$ is 16.00. For the code obtained by concatenation of a Divsalar code and STBC, a minimum effective length $\delta_{min}$ is 4, a minimum product distance $pd_{min}$ is 16, and a minimum average product distance $pd_{min,avg}$ is 7.76. Further, the STTC proposed by Firmanto has coding gain of 3.47 dB over the STTC proposed by Tarokh, and the code obtained by concatenation of the Ungerboeck code and the STBC has coding gain of 4.78 dB over the STTC proposed by Tarokh.

As illustrated in FIG. 3, performance of codes for the case where the STTC design criterion of the invention is applied is different from performance of codes for the case where the STTC design criterion is not applied. As a result, when the STTC design criterion of the invention is applied in generating STTC, it is possible to secure maximum code performance. Now, with reference to FIG. 4, a description will be made of performances of the codes described in conjunction with FIG. 3 in a fast Rayleigh fading environment.

Figure 4:
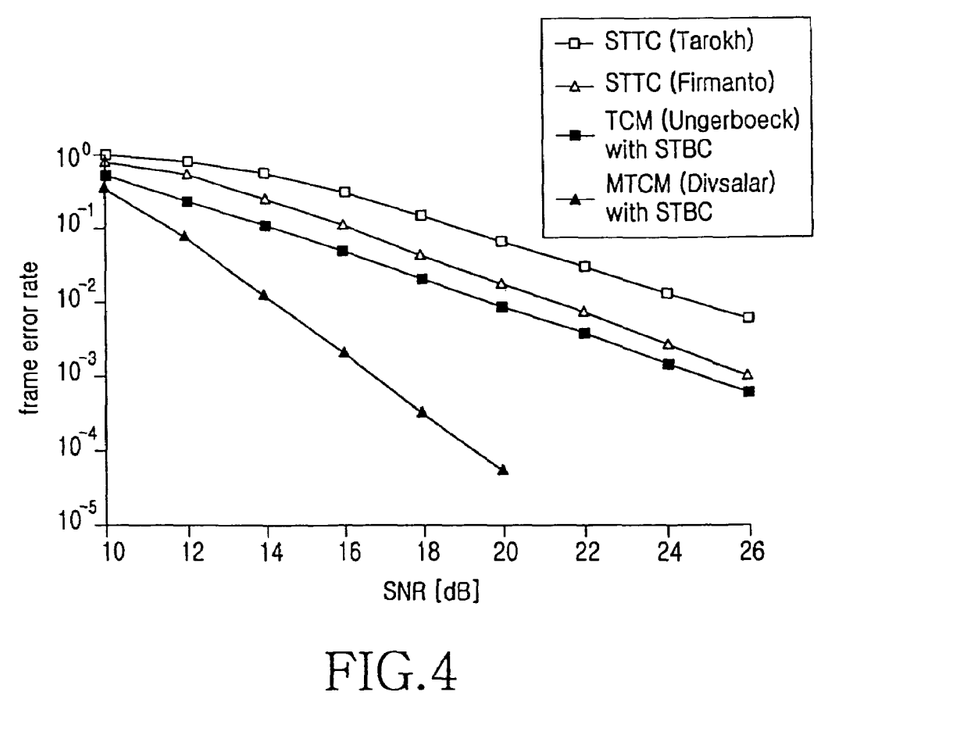
FIG. 4 is a graph illustrating performance curves of the codes of FIG. 3 in a fast Rayleigh fading environment.

FIG. 4 is a graph illustrating performance curves of the codes of FIG. 3 in a fast Rayleigh fading environment. It is assumed in FIG. 4 that a frame having 130 modulation symbols is transmitted for 20 ms and a 13×10 block interleaver is used for channel interleaving. In addition, it is assumed that in the Rayleigh fading environment, a carrier frequency is 2 GHz and a moving speed is 120 Km/h, and that channel state information is previously known between a transmitter and a receiver. Shown in FIG. 4 is a correlation between a signal-to-noise ratio (hereinafter referred to as "SNR") and a frame error rate (hereinafter referred to as "FER") of the codes considered in FIG. 3, i.e., the STTC proposed by Tarokh, the STTC proposed by Firmanto, the code obtained by concatenation of an Ungerboeck code and STBC, and the code obtained by concatenation of a Divsalar code and STBC. Herein, the SNR is $2E_S/N_O$ (SNR=$2E_S/N_O$). Further, in FIG. 4, a slope of an FER curve shows diversity gain.

Referring to FIG. 4, an FER slope of the code (with a minimum effective length $\delta_{min}$=4) obtained by concatenation of a Divsalar code and STBC is a very steep characteristic compared with other codes. At $10^{-2}$ FER, performance gain of the code obtained by concatenation of a Divsalar code and STBC has additional gain of about 7 dB over the previously known STTC code. That is, the performance gain of the code obtained by concatenation of a Divsalar code and STBC is generated from supplemental time diversity which uses multiple modulation symbols per trellis branch. In addition, for the cases where the minimum effective length $\delta_{min}$ is 2 ($\delta_{min}$=2), a horizontal shift of the performance curve shows coding gain. Coding gain of the code obtained by concatenation of an Ungerboeck code and STBC is greater than coding gain of the STTC proposed by Firmanto, because of a minimum product distance design criterion, i.e., because a minimum average product distance $pd_{min,avg}$ of the code obtained by concatenation of an Ungerboeck code and STBC is longer than a minimum average product distance $pd_{min,avg}$ of the STTC proposed by Firmanto. As illustrated in FIG. 4, in an actual channel environment, i.e., in a fast Rayleigh fading environment, an STTC design criterion of the invention, i.e., a design criterion related to a minimum average product distance $pd_{min,avg}$ results in performance improvement of codes.

Next, a trellis structure of STTC that satisfies an STTC design criterion of the invention will be described with reference to FIGS. 5 to 7.

Figure 5:
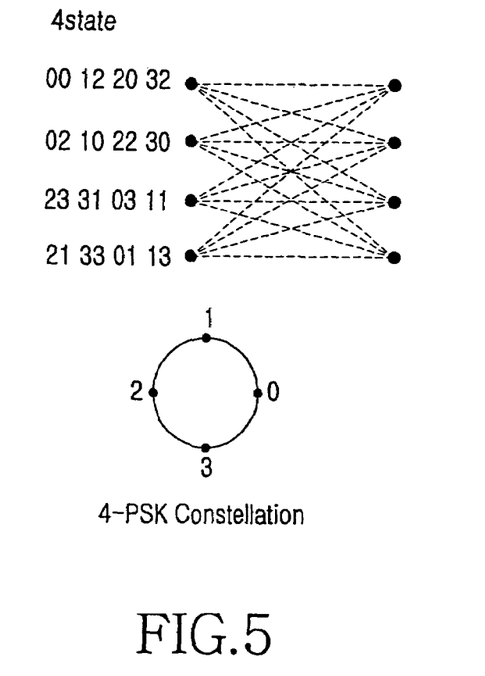
FIG. 5 illustrates a 4-state STTC trellis structure based on an STTC design criterion of the invention.

FIG. 5 illustrates a 4-state STTC trellis structure based on an STTC design criterion of the invention. Before a description of FIG. 5, it will be assumed that in designing a STTC system, there exist two transmission antennas consisting of a first transmission antenna and a second transmission antenna. Of course, although the number of transmission antennas considered in designing the STTC can be set to the number of transmission antennas included in the system, two transmission antennas will be considered herein for simplicity. Referring to FIG. 5, since there are four states, the number of input information data bits for STTC encoding is 2. Therefore, consideration is taken into four states, i.e., a case where information data bits received at a previous symbol time are 00, a case where information data bits received at a previous symbol time are 01, a case where information data bits received at a previous symbol time are 10, and a case where information data bits received at a previous symbol time are 11.

First, when information data bits received at a previous symbol time are 00, STTC is generated so that if information data bits received at a current symbol time are 00, 0 is mapped to a first transmission antenna and 0 is mapped to a second transmission antenna; if information data bits received at a current symbol time are 01, 1 is mapped to the first transmission antenna and 2 is mapped to the second transmission antenna; if information data bits received at a current symbol time are 10, 2 is mapped to the first transmission antenna and 0 is mapped to the second transmission antenna; and if information data bits received at a current symbol time are 11, 3 is mapped to the first transmission antenna and 2 is mapped to the second transmission antenna. At this point, signals 0 to 3 provided to the antennas represent one signal on a QPSK constellation illustrated in FIG. 5. For example a signal 0 represents sending a real value 1 and an imaginary value 0, a signal 1 represents a real value 0 and an imaginary value 1, a signal 2 represents sending a real value −1 and an imaginary value 0, and a signal 3 represents sending a real value 0 and an imaginary value −1.

Second, when information data bits received at a previous symbol time are 01, STTC is generated so that if information data bits received at a current symbol time are 00, 0 is mapped to a first transmission antenna and 2 is mapped to a second transmission antenna; if information data bits received at a current symbol time are 01, 1 is mapped to the first transmission antenna and 0 is mapped to the second transmission antenna; if information data bits received at a current symbol time are 10, 2 is mapped to the first transmission antenna and 2 is mapped to the second transmission antenna; and if information data bits received at a current symbol time are 11, 3 is mapped to the first transmission antenna and 0 is mapped to the second transmission antenna.

Third, when information data bits received at a previous symbol time are 10, STTC is generated so that if information data bits received at a current symbol time are 00, 2 is mapped to a first transmission antenna and 3 is mapped to a second transmission antenna; if information data bits received at a current symbol time are 01, 3 is mapped to the first transmission antenna and 1 is mapped to the second transmission antenna; if information data bits received at a current symbol time are 10, 0 is mapped to the first transmission antenna and 3 is mapped to the second transmission antenna; and if information data bits received at a current symbol time are 11, 1 is mapped to the first transmission antenna and 1 is mapped to the second transmission antenna.

Fourth, when information data bits received at a previous symbol time are 11, STTC is generated so that if information data bits received at a current symbol time are 00, 2 is mapped to a first transmission antenna and 1 is mapped to a second transmission antenna; if information data bits received at a current symbol time are 01, 3 is mapped to the first transmission antenna and 3 is mapped to the second transmission antenna; if information data bits received at a current symbol time are 10, 0 is mapped to the first transmission antenna and 1 is mapped to the second transmission antenna; and if information data bits received at a current symbol time are 11, 1 is mapped to the first transmission antenna and 3 is mapped to the second transmission antenna.

As described in conjunction with FIG. 5, when two transmission antennas are considered and a 4-PSK scheme is considered as a modulation scheme in the 4-state trellis structure, STTC satisfying an STTC design criterion of the invention based on 2-bit input information data selects "00122032", "02102230", "23310311", and "21330113" as symbols to be output via each of the antennas according to currently received information data. An STTC code satisfying an STTC design criterion of the invention in the 4-state trellis structure has been described so far with reference to FIG. 5. Next, an STTC code satisfying an STTC design criterion of the invention in an 8-state trellis structure will be described with reference to FIG. 6.

Figure 6:
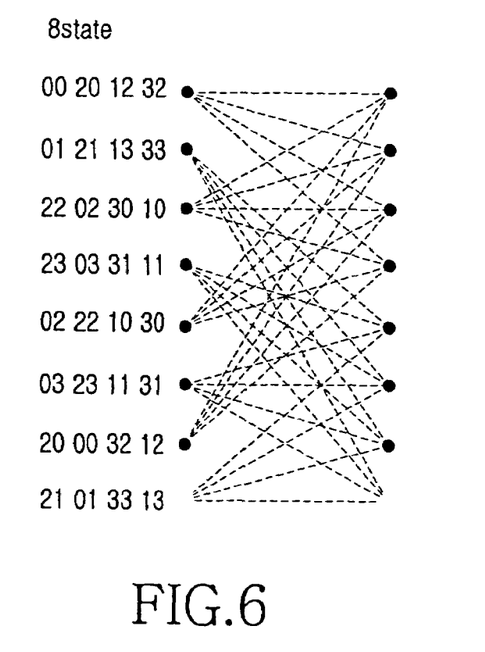
FIG. 6 illustrates an 8-state STTC trellis structure based on an STTC design criterion of the invention.

FIG. 6 illustrates an 8-state STTC trellis structure based on an STTC design criterion of the invention. Before a description of FIG. 6, it will be assumed that in designing STTC, there exist two transmission antennas consisting of a first transmission antenna and a second transmission antenna as described in conjunction with FIG. 5. Of course, although the number of transmission antennas considered in designing the STTC can be set to to the number of transmission antennas included in the system, two transmission antennas will be considered herein for simplicity. Referring to FIG. 6, since there are eight states, the number of input information data bits for STTC encoding is 3. Therefore, consideration is taken into eight states, i.e., a case where information data bits received at a previous symbol time are 000, a case where information data bits received at a previous symbol time are 001, a case where information data bits received at a previous symbol time are 010, a case where information data bits received at a previous symbol time are 011, a case where information data bits received at a previous symbol time are 100, a case where information data bits received at a previous symbol time are 101, a case where information data bits received at a previous symbol time are 110, and a case where information data bits received at a previous symbol time are 111.

First, when information data bits received at a previous symbol time are 000, STTC is generated so that if information data bits received at a current symbol time are 00, 0 is mapped to a first transmission antenna and 0 is mapped to a second transmission antenna; if information data bits received at a current symbol time are 01, 2 is mapped to the first transmission antenna and 0 is mapped to the second transmission antenna; if information data bits received at a current symbol time are 10, 1 is mapped to the first transmission antenna and 2 is mapped to the second transmission antenna; and if information data bits received at a current symbol time are 11, 3 is mapped to the first transmission antenna and 2 is mapped to the second transmission antenna.

Second, when information data bits received at a previous symbol time are 001, STTC is generated so that if information data bits received at a current symbol time are 00, 0 is mapped to a first transmission antenna and 1 is mapped to a second transmission antenna; if information data bits received at a current symbol time are 01, 2 is mapped to the first transmission antenna and 1 is mapped to the second transmission antenna; if information data bits received at a current symbol time are 10, 1 is mapped to the first transmission antenna and 3 is mapped to the second transmission antenna; and if information data bits received at a current symbol time are 11, 3 is mapped to the first transmission antenna and 3 is mapped to the second transmission antenna.

Third, when information data bits received at a previous symbol time are 010, STTC is generated so that if information data bits received at a current symbol time are 00, 2 is mapped to a first transmission antenna and 2 is mapped to a second transmission antenna; if information data bits received at a current symbol time are 01, 0 is mapped to the first transmission antenna and 2 is mapped to the second transmission antenna; if information data bits received at a current symbol time are 10, 3 is mapped to the first transmission antenna and 0 is mapped to the second transmission antenna; and if information data bits received at a current symbol time are 11, 1 is mapped to the first transmission antenna and 0 is mapped to the second transmission antenna.

Fourth, when information data bits received at a previous symbol time are 011, STTC is generated so that if information data bits received at a current symbol time are 00, 2 is mapped to a first transmission antenna and 3 is mapped to a second transmission antenna; if information data bits received at a current symbol time are 01, 0 is mapped to the first transmission antenna and 3 is mapped to the second transmission antenna; if information data bits received at a current symbol time are 10, 3 is mapped to the first transmission antenna and 1 is mapped to the second transmission antenna; and if information data bits received at a current symbol time are 11, 1 is mapped to the first transmission antenna and 1 is mapped to the second transmission antenna.

Fifth, when information data bits received at a previous symbol time are 100, STTC is generated so that if information data bits received at a current symbol time are 00, 0 is mapped to a first transmission antenna and 2 is mapped to a second transmission antenna; if information data bits received at a current symbol time are 01, 2 is mapped to the first transmission antenna and 2 is mapped to the second transmission antenna; if information data bits received at a current symbol time are 10, 1 is mapped to the first transmission antenna and 0 is mapped to the second transmission antenna; and if information data bits received at a current symbol time are 11, 3 is mapped to the first transmission antenna and 0 is mapped to the second transmission antenna.

Sixth, when information data bits received at a previous symbol time are 101, STTC is generated so that if information data bits received at a current symbol time are 00, 0 is mapped to a first transmission antenna and 3 is mapped to a second transmission antenna; if information data bits received at a current symbol time are 01, 2 is mapped to the first transmission antenna and 3 is mapped to the second transmission antenna; if information data bits received at a current symbol time are 10, 1 is mapped to the first transmission antenna and 1 is mapped to the second transmission antenna; and if information data bits received at a current symbol time are 11, 3 is mapped to the first transmission antenna and 1 is mapped to the second transmission antenna.

Seventh, when information data bits received at a previous symbol time are 110, STTC is generated so that if information data bits received at a current symbol time are 00, 2 is mapped to a first transmission antenna and 0 is mapped to a second transmission antenna; if information data bits received at a current symbol time are 01, 0 is mapped to the first transmission antenna and 0 is mapped to the second transmission antenna; if information data bits received at a current symbol time are 10, 3 is mapped to the first transmission antenna and 2 is mapped to the second transmission antenna; and if information data bits received at a current symbol time are 11, 1 is mapped to the first transmission antenna and 2 is mapped to the second transmission antenna.

Eighth, when information data bits received at a previous symbol time are 111, STTC is generated so that if information data bits received at a current symbol time are 00, 2 is mapped to a first transmission antenna and 1 is mapped to a second transmission antenna; if information data bits received at a current symbol time are 01, 0 is mapped to the first transmission antenna and 1 is mapped to the second transmission antenna; if information data bits received at a current symbol time are 10, 3 is mapped to the first transmission antenna and 3 is mapped to the second transmission antenna; and if information data bits received at a current symbol time are 11, 1 is mapped to the first transmission antenna and 3 is mapped to the second transmission antenna.

As described in conjunction with FIG. 6, when two transmission antennas are considered and a 4-PSK scheme is considered as a modulation scheme in the 8-state trellis structure, STTC satisfying an STTC design criterion of the invention based on 3-bit input information data selects "00201232", "01211333", "22023010", "23033111", "02221030", "03231131", "20003212", and "21013313" as symbols to be output via each of the antennas according to currently received information data. An STTC code satisfying an STTC design criterion of the invention in the 8-state trellis structure has been described so far with reference to FIG. 6. Next, an STTC code satisfying an STTC design criterion of the invention in a 16-state trellis structure will be described with reference to FIG. 7.

Figure 7:
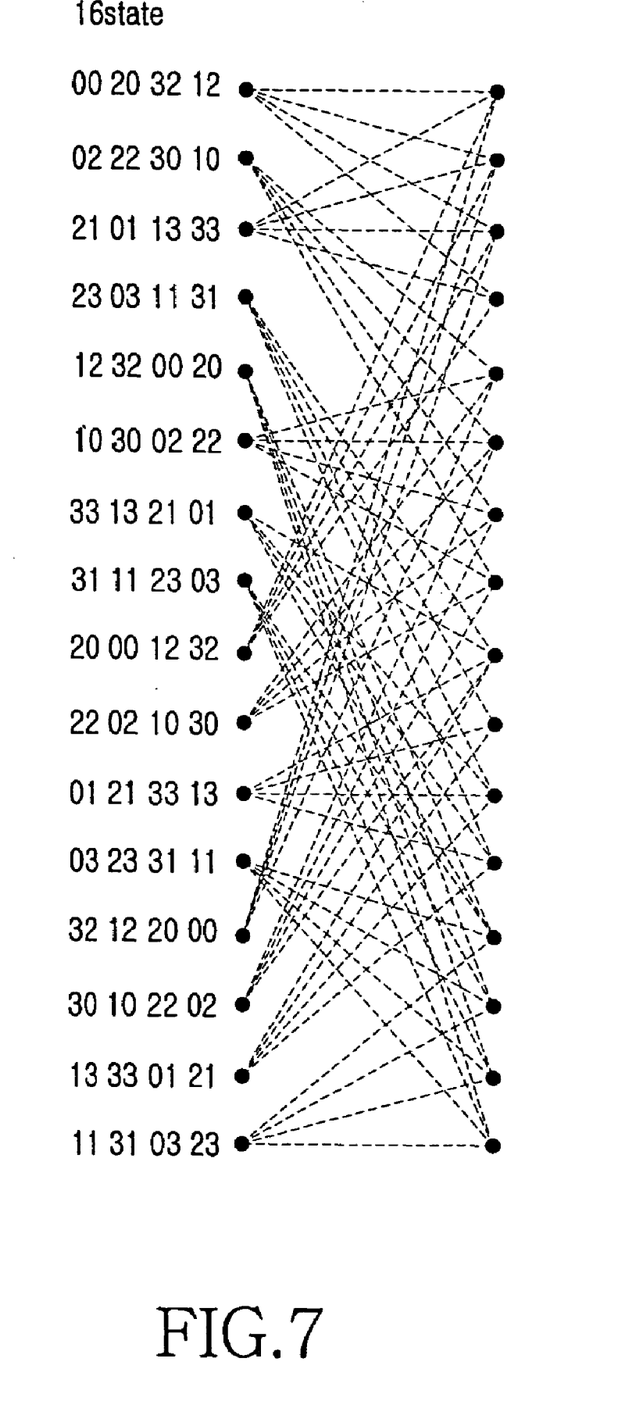
FIG. 7 illustrates a 16-state STTC trellis structure based on an STTC design criterion of the invention.

FIG. 7 illustrates a 16-state STTC trellis structure based on an STTC design criterion of the invention. Before a description of FIG. 7, it will be assumed that in designing STTC, there exist two transmission antennas consisting of a first transmission antenna and a second transmission antenna as described in conjunction with FIGS. 5 and 6. Of course, although the number of transmission antennas considered in designing the STTC can be set to the number of transmission antennas included in the system, two transmission antennas will be considered herein for simplicity. Referring to FIG. 7, since there are sixteen states, the number of input information data bits for STTC encoding is 4. Therefore, consideration is taken into sixteen states, i.e., a case where information data bits received at a previous symbol time are 0000, a case where information data bits received at a previous symbol time are 0001, a case where information data bits received at a previous symbol time are 0010, a case where information data bits received at a previous symbol time are 0011, a case where information data bits received at a previous symbol time are 0100, a case where information data bits received at a previous symbol time are 0101, a case where information data bits received at a previous symbol time are 0110, a case where information data bits received at a previous symbol time are 0111, a case where information data bits received at a previous symbol time are 1000, a case where information data bits received at a previous symbol time are 1001, a case where information data bits received at a previous symbol time are 1010, a case where information data bits received at a previous symbol time are 1011, a case where information data bits received at a previous symbol time are 1100, a case where information data bits received at a previous symbol time are 1101, a case where information data bits received at a previous symbol time are 1110, and a case where information data bits received at a previous symbol time are 1111.

First, when information data bits received at a previous symbol time are 0000, STTC is generated so that if information data bits received at a current symbol time are 00, 0 is mapped to a first transmission antenna and 0 is mapped to a second transmission antenna; if information data bits received at a current symbol time are 01, 2 is mapped to the first transmission antenna and 0 is mapped to the second transmission antenna; if information data bits received at a current symbol time are 10, 3 is mapped to the first transmission antenna and 2 is mapped to the second transmission antenna; and if information data bits received at a current symbol time are 11, 1 is mapped to the first transmission antenna and 2 is mapped to the second transmission antenna.

Second, when information data bits received at a previous symbol time are 0001, STTC is generated so that if information data bits received at a current symbol time are 00, 0 is mapped to a first transmission antenna and 2 is mapped to a second transmission antenna; if information data bits received at a current symbol time are 01, 2 is mapped to the first transmission antenna and 2 is mapped to the second transmission antenna; if information data bits received at a current symbol time are 10, 3 is mapped to the first transmission antenna and 0 is mapped to the second transmission antenna; and if information data bits received at a current symbol time are 11, 1 is mapped to the first transmission antenna and 0 is mapped to the second transmission antenna.

Third, when information data bits received at a previous symbol time are 0010, STTC is generated so that if information data bits received at a current symbol time are 00, 2 is mapped to a first transmission antenna and 1 is mapped to a second transmission antenna; if information data bits received at a current symbol time are 01, 0 is mapped to the first transmission antenna and 1 is mapped to the second transmission antenna; if information data bits received at a current symbol time are 10, 1 is mapped to the first transmission antenna and 3 is mapped to the second transmission antenna; and if information data bits received at a current symbol time are 11, 3 is mapped to the first transmission antenna and 3 is mapped to the second transmission antenna.

Fourth, when information data bits received at a previous symbol time are 0011, STTC is generated so that if information data bits received at a current symbol time are 00, 2 is mapped to a first transmission antenna and 3 is mapped to a second transmission antenna; if information data bits received at a current symbol time are 01, 0 is mapped to the first transmission antenna and 3 is mapped to the second transmission antenna; if information data bits received at a current symbol time are 10, 1 is mapped to the first transmission antenna and 1 is mapped to the second transmission antenna; and if information data bits received at a current symbol time are 11, 3 is mapped to the first transmission antenna and 1 is mapped to the second transmission antenna.

Fifth, when information data bits received at a previous symbol time are 0100, STTC is generated so that if information data bits received at a current symbol time are 00, 1 is mapped to a first transmission antenna and 2 is mapped to a second transmission antenna; if information data bits received at a current symbol time are 01, 3 is mapped to the first transmission antenna and 2 is mapped to the second transmission antenna; if information data bits received at a current symbol time are 10, 0 is mapped to the first transmission antenna and 0 is mapped to the second transmission antenna; and if information data bits received at a current symbol time are 11, 2 is mapped to the first transmission antenna and 0 is mapped to the second transmission antenna.

Sixth, when information data bits received at a previous symbol time are 0101, STTC is generated so that if information data bits received at a current symbol time are 00, 1 is mapped to a first transmission antenna and 0 is mapped to a second transmission antenna; if information data bits received at a current symbol time are 01, 3 is mapped to the first transmission antenna and 0 is mapped to the second transmission antenna; if information data bits received at a current symbol time are 10, 0 is mapped to the first transmission antenna and 2 is mapped to the second transmission antenna; and if information data bits received at a current symbol time are 11, 2 is mapped to the first transmission antenna and 2 is mapped to the second transmission antenna.

Seventh, when information data bits received at a previous symbol time are 0110, STTC is generated so that if information data bits received at a current symbol time are 00, 3 is mapped to a first transmission antenna and 3 is mapped to a second transmission antenna; if information data bits received at a current symbol time are 01, 1 is mapped to the first transmission antenna and 3 is mapped to the second transmission antenna; if information data bits received at a current symbol time are 10, 2 is mapped to the first transmission antenna and 1 is mapped to the second transmission antenna; and if information data bits received at a current symbol time are 11, 0 is mapped to the first transmission antenna and 1 is mapped to the second transmission antenna.

Eighth, when information data bits received at a previous symbol time are 0111, STTC is generated so that if information data bits received at a current symbol time are 00, 3 is mapped to a first transmission antenna and 1 is mapped to a second transmission antenna; if information data bits received at a current symbol time are 01, 1 is mapped to the first transmission antenna and 1 is mapped to the second transmission antenna; if information data bits received at a current symbol time are 10, 2 is mapped to the first transmission antenna and 3 is mapped to the second transmission antenna; and if information data bits received at a current symbol time are 11, 0 is mapped to the first transmission antenna and 3 is mapped to the second transmission antenna.

Ninth, when information data bits received at a previous symbol time are 1000, STTC is generated so that if information data bits received at a current symbol time are 00, 2 is mapped to a first transmission antenna and 0 is mapped to a second transmission antenna; if information data bits received at a current symbol time are 01, 0 is mapped to the first transmission antenna and 0 is mapped to the second transmission antenna; if information data bits received at a current symbol time are 10, 1 is mapped to the first transmission antenna and 2 is mapped to the second transmission antenna; and if information data bits received at a current symbol time are 11, 3 is mapped to the first transmission antenna and 2 is mapped to the second transmission antenna.

Tenth, when information data bits received at a previous symbol time are 1001, STTC is generated so that if information data bits received at a current symbol time are 00, 2 is mapped to a first transmission antenna and 2 is mapped to a second transmission antenna; if information data bits received at a current symbol time are 01, 0 is mapped to the first transmission antenna and 2 is mapped to the second transmission antenna; if information data bits received at a current symbol time are 10, 1 is mapped to the first transmission antenna and 0 is mapped to the second transmission antenna; and if information data bits received at a current symbol time are 11, 3 is mapped to the first transmission antenna and 0 is mapped to the second transmission antenna.

Eleventh, when information data bits received at a previous symbol time are 1010, STTC is generated so that if information data bits received at a current symbol time are 00, 0 is mapped to a first transmission antenna and 1 is mapped to a second transmission antenna; if information data bits received at a current symbol time are 01, 2 is mapped to the first transmission antenna and 1 is mapped to the second transmission antenna; if information data bits received at a current symbol time are 10, 3 is mapped to the first transmission antenna and 3 is mapped to the second transmission antenna; and if information data bits received at a current symbol time are 11, 1 is mapped to the first transmission antenna and 3 is mapped to the second transmission antenna.

Twelfth, when information data bits received at a previous symbol time are 1011, STTC is generated so that if information data bits received at a current symbol time are 00, 0 is mapped to a first transmission antenna and 3 is mapped to a second transmission antenna; if information data bits received at a current symbol time are 01, 2 is mapped to the first transmission antenna and 3 is mapped to the second transmission antenna; if information data bits received at a current symbol time are 10, 3 is mapped to the first transmission antenna and 1 is mapped to the second transmission antenna; and if information data bits received at a current symbol time are 11, 1 is mapped to the first transmission antenna and 1 is mapped to the second transmission antenna.

Thirteenth, when information data bits received at a previous symbol time are 1100, STTC is generated so that if information data bits received at a current symbol time are 00, 3 is mapped to a first transmission antenna and 2 is mapped to a second transmission antenna; if information data bits received at a current symbol time are 01, 1 is mapped to the first transmission antenna and 2 is mapped to the second transmission antenna; if information data bits received at a current symbol time are 10, 2 is mapped to the first transmission antenna and 0 is mapped to the second transmission antenna; and if information data bits received at a current symbol time are 11, 0 is mapped to the first transmission antenna and 0 is mapped to the second transmission antenna.

Fourteenth, when information data bits received at a previous symbol time are 1101, STTC is generated so that if information data bits received at a current symbol time are 00, 3 is mapped to a first transmission antenna and 0 is mapped to a second transmission antenna; if information data bits received at a current symbol time are 01, 1 is mapped to the first transmission antenna and 0 is mapped to the second transmission antenna; if information data bits received at a current symbol time are 10, 2 is mapped to the first transmission antenna and 2 is mapped to the second transmission antenna; and if information data bits received at a current symbol time are 11, 0 is mapped to the first transmission antenna and 2 is mapped to the second transmission antenna.

Fifteenth, when information data bits received at a previous symbol time are 1110, STTC is generated so that if information data bits received at a current symbol time are 00, 1 is mapped to a first transmission antenna and 3 is mapped to a second transmission antenna; if information data bits received at a current symbol time are 01, 3 is mapped to the first transmission antenna and 3 is mapped to the second transmission antenna; if information data bits received at a current symbol time are 10, 0 is mapped to the first transmission antenna and 1 is mapped to the second transmission antenna; and if information data bits received at a current symbol time are 11, 2 is mapped to the first transmission antenna and 1 is mapped to the second transmission antenna.

Sixteenth, when information data bits received at a previous symbol time are 1111, STTC is generated so that if information data bits received at a current symbol time are 00, 1 is mapped to a first transmission antenna and 1 is mapped to a second transmission antenna; if information data bits received at a current symbol time are 01, 3 is mapped to the first transmission antenna and 1 is mapped to the second transmission antenna; if information data bits received at a current symbol time are 10, 0 is mapped to the first transmission antenna and 3 is mapped to the second transmission antenna; and if information data bits received at a current symbol time are 11, 2 is mapped to the first transmission antenna and 3 is mapped to the second transmission antenna.

As described in conjunction with FIG. 7, when two transmission antennas are considered and a 4-PSK scheme is considered as a modulation scheme in the 16-state trellis structure, STTC satisfying an STTC design criterion of the invention based on 4 input information data bits selects "00203212", "02223010", "21011333", "23031131", "12320020", "10300222", "33132101", "31112303", "20001232", "22021030", "01213313", "03233111", "32122000", "30102202", "13330121" and "11310323" as symbols to be output via each of the antennas according to currently received information data.

Next, with reference to FIG. 8, a comparison will be made between performance parameters of 4-state STTC, 8-state STTC and 16-state STTC described in conjunction with FIGS. 5 to 7 and performance parameters of the conventional 4-state STTC, 8-state STTC and 16-state STTC.

Figure 8:
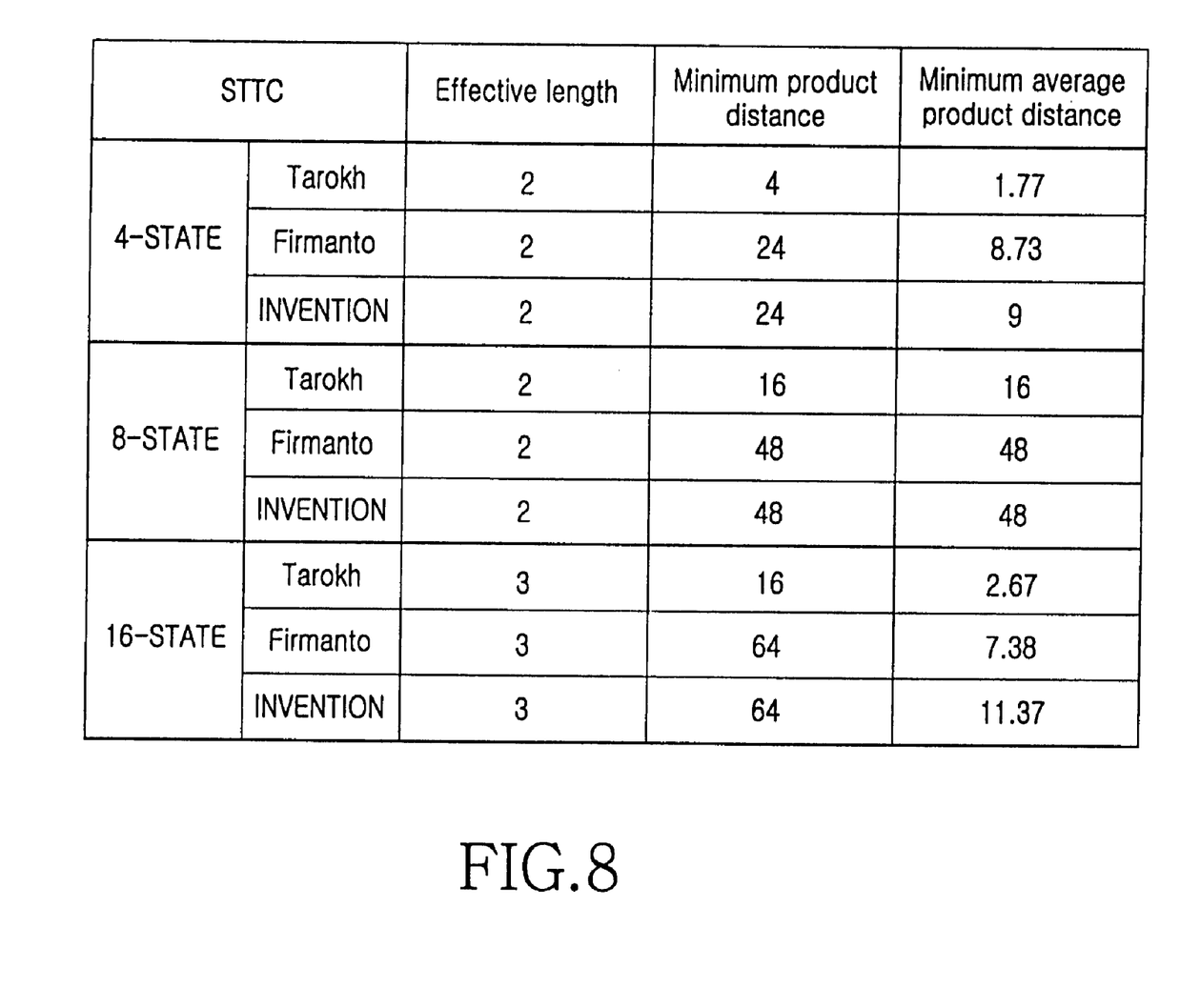
FIG. 8 is a table illustrating performance parameters of 4-state STTC, 8-state STTC and 16-state STTC for the case where an STTC design criterion of the invention is applied and for the case where the STTC design criterion is not applied.

FIG. 8 is a table illustrating performance parameters of 4-state STTC, 8-state STTC and 16-state STTC for the case where an STTC design criterion of the invention is applied and performance parameters of 4-state STTC, 8-state STTC and 16-state STTC for the case where the STTC design criterion is not applied.

Referring to FIG. 8, a description will first be made of a comparison between performance parameters of 4-state STTCs. For the STTC proposed by Tarokh, an effective length is 2, a minimum product distance is 4, and a minimum average product distance is 1.77. For the STTC proposed by Firmanto, an effective length is 2, a minimum product distance is 24, and a minimum average product distance is 8.73. For the STTC proposed in the invention, an effective length is 2, a minimum product distance is 24, and a minimum average product distance is 9. That is, in the 4-state trellis structure, the STTC proposed in the invention has the best performance. Second, a comparison will be made between performance parameters of 8-state STTCs. For the STTC proposed by Tarokh, an effective length is 2, a minimum product distance is 16, and a minimum average product distance is 16. For the STTC proposed by Firmanto, an effective length is 2, a minimum product distance is 48, and a minimum average product distance is 48. For the STTC proposed in the invention, an effective length is 2, a minimum product distance is 48, and a minimum average product distance is 48. That is, in the 8-state trellis structure, both the STTC proposed by Firmanto and the STTC proposed in the invention have good performance. Third, a comparison will be made between performance parameters of 16-state STTCs. For the STTC proposed by Tarokh, an effective length is 3, a minimum product distance is 16, and a minimum average product distance is 2.67. For the STTC proposed by Firmanto, an effective length is 3, a minimum product distance is 64, and a minimum average product distance is 7.38. For the STTC proposed in the invention, an effective length is 3, a minimum product distance is 64, and a minimum average product distance is 11.37. That is, in the 16-state trellis structure, the STTC proposed in the invention has the best performance. As a result, the best STTC having the best minimum product distance performance representing coding gain is the STTC proposed in the invention.

Figure 9:
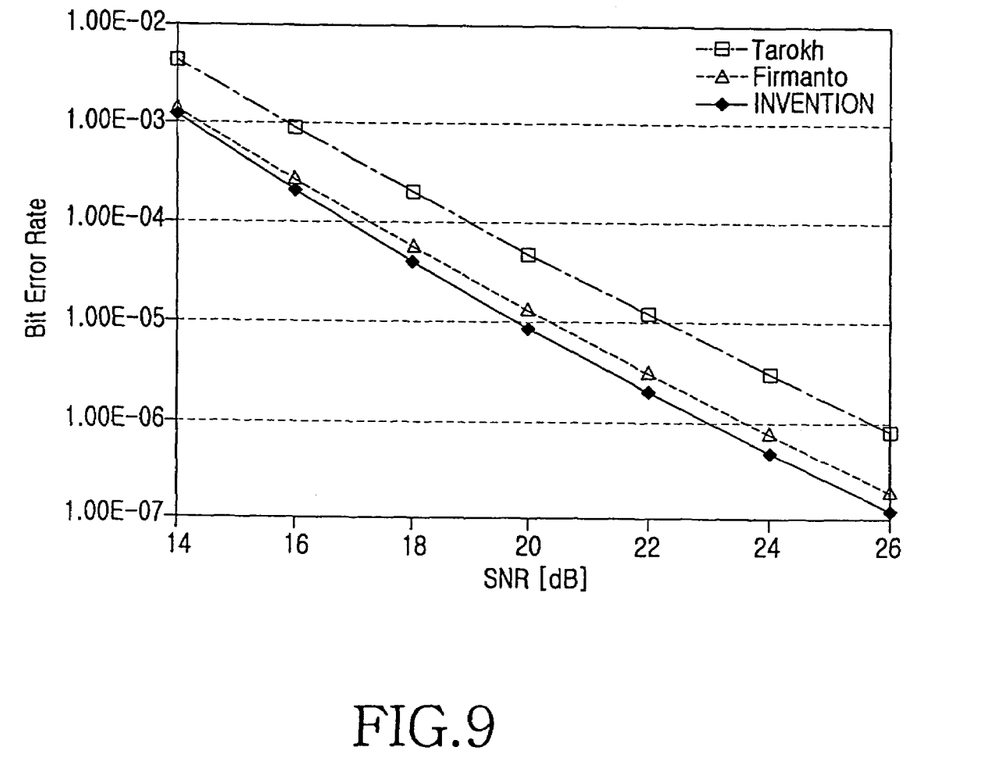
FIG. 9 is a graph illustrating performance curves of 16-state STTC codes of FIG. 8 in a fast Rayleigh fading environment

With reference to FIG. 9, a description will now be made of performances of the codes described in conjunction with FIG. 8 in a fast Rayleigh fading environment.

FIG. 9 is a graph illustrating performance curves of 16-state STTC codes of FIG. 8 in a fast Rayleigh fading environment. It will be assumed in FIG. 9 that a frame having 130 modulation symbols is transmitted for 20 ms and a 13×10 block interleaver is used for channel interleaving. In addition, it is assumed that in the Rayleigh fading environment, a carrier frequency is 2 GHz and a moving speed is 120 Km/h, and that channel state information is previously known between a transmitter and a receiver. Shown in FIG. 9 is a correlation between a signal-to-noise ratio (hereinafter referred to as "SNR") and a frame error rate (hereinafter referred to as "FER") of the 16-state STTC proposed by Tarokh, the 16-state STTC proposed by Firmanto, and the 16-state STTC according to the present invention, among the codes considered in FIG. 8.

Referring to FIG. 9, a BER characteristic of the STTC according to the invention is superior to a BER characteristic of the STTC proposed by Tarokh and a BER characteristic of the STTC proposed by Firmanto. That is, the BER characteristic of the STTC according to the invention has supplemental gain of about 0.5 dB over the BER characteristic of the STTC proposed by Firmanto. As illustrated in FIG. 9, in an actual channel environment, i.e., in a fast Rayleigh fading environment, an STTC design criterion of the invention, i.e., a design criterion related to a minimum average product distance $pd_{min,avg}$, contributes to performance improvement in a BER characteristic.

As described above, the invention can maximize diversity gain and coding gain during transmission in a fast Rayleigh fading environment by providing STTC having a minimum average product distance. The maximization of diversity gain and coding gain minimizes probability that an error will occur during transmission and reception of STTC.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for generating a space-time trellis code (STTC) for maximizing space-time diversity gain and coding gain in a mobile communication system including at least two transmission antennas, the STTC having an information data bit stream comprised of a number of bits, the method comprising the steps of:
    calculating a minimum effective length for each information data bit stream;
    calculating product distances between information data bit streams having a length equal to the minimum effective length, wherein for each pair of all initial states and all end states for each of the information data bit streams, initial states are identical to end states;
    summing reciprocals of the calculated product distances and calculating minimum average product distances by determining a reciprocal of the summation result; and
    generating a STTC code corresponding to an information data bit stream having a maximum value among the calculated minimum average product distances.

2. The method of claim 1, wherein the minimum average product distance is calculated by $$pd_{\delta,avg}^{-1} == \sum_{all\ incorrect\ path\ of\ \delta} \prod_{t \in \eta} \|c_t - c_t'\|^{-2}$$

where $pd_{\delta,avg}$ represents a minimum average product distance of an information data bit stream having a minimum effective length $\delta$, $\eta$ represents a set of all t's with $c_t \neq c_t'$, $c_t$ represents a codeword comprised of a number of bits, and $c_t'$ represents a defective codeword.

3. The method of claim 1, wherein if the number of input bits for an STTC encoder is 2 and a modulation scheme previously set in the mobile communication system is a 4-PSK (Phase Shift Keying) scheme, when an information data bit stream received at a previous symbol time is 00 and information data bit streams received at a current symbol time are 00, 01, 10 and 11, an STTC code of 00122032 is generated; when an information data bit stream received at a previous symbol time is 01 and information data bit streams received at a current symbol time are 00, 01, 10 and 11, an STTC code of 02102230 is generated; when an information data bit stream received at a previous symbol time is 10 and information data bit streams received at a current symbol time are 00, 01, 10 and 11, an STTC code of 23310311 is generated; and when an information data bit stream received at a previous symbol time is 11 and information data bit streams received at a current symbol time are 00, 01, 10 and 11, an STTC code of 21330113 is generated.

4. The method of claim 1, wherein if the number of input bits for an STTC encoder is 3 and a modulation scheme previously set in the mobile communication system is a 4-PSK scheme, when an information data bit stream received at a previous symbol time is 000 and information data bit streams received at a current symbol time are 00, 01, 10 and 11, an STTC code of 00201232 is selected; when an information data bit stream received at a previous symbol time is 001 and information data bit streams received at a current symbol time are 00, 01, 10 and 11, an STTC code of 01211333 is generated; when an information data bit stream received at a previous symbol time is 010 and information data bit streams received at a current symbol time are 00, 01, 10 and 11, an STTC code of 22023010 is generated; when an information data bit stream received at a previous symbol time is 011 and information data bit streams received at a current symbol time are 00, 01, 10 and 11, an STTC code of 23033111 is generated; when an information data bit stream received at a previous symbol time is 100 and information data bit streams received at a current symbol time are 00, 01, 10 and 11, an STTC code of 02221030 is generated; when an information data bit stream received at a previous symbol time is 101 and information data bit streams received at a current symbol time are 00, 01, 10 and 11, an STTC code of 03231131 is generated; when an information data bit stream received at a previous symbol time is 110 and information data bit streams received at a current symbol time are 00, 01, 10 and 11, an STTC code of 20003212 is generated; and when an information data bit stream received at a previous symbol time is 111 and information data bit streams received at a current symbol time are 00, 01, 10 and 11, an STTC code of 21013313 is generated.

5. The method of claim 1, wherein if the number of input bits for encoder is 4 and a modulation scheme previously set in the mobile communication system is a 4-PSK scheme, when an information data bit stream received at a previous symbol time is 0000 and information data bit streams received at a current symbol time are 00, 01, 10 and 11, an STTC code of 00203212 is generated; when an information data bit stream received at a previous symbol time is 0001 and information data bit streams received at a current symbol time are 00, 01, 10 and 11, an STTC code of 02223010 is generated; when an information data bit stream received at a previous symbol time is 0010 and information data bit streams received at a current symbol time are 00, 01, 10 and 11, an STTC code of 21011333 is generated; when an information data bit stream received at a previous symbol time is 0011 and information data bit streams received at a current symbol time are 00, 01, 10 and 11, an STTC code of 23031131 is generated; when an information data bit stream received at a previous symbol time is 0100 and information data bit streams received at a current symbol time are 00, 01, 10 and 11, an STTC code of 12320020 is generated; when an information data bit stream received at a previous symbol time is 0101 and information data bit streams received at a current symbol time are 00, 01, 10 and 11, an STTC code of 10300222 is generated; when an information data bit stream received at a previous symbol time is 0110 and information data bit streams received at a current symbol time are 00, 01, 10 and 11, an STTC code of 33132101 is generated; when an information data bit stream received at a previous symbol time is 0111 and information data bit streams received at a current symbol time are 00, 01, 10 and 11, an STTC code of 31112303 is generated; when an information data bit stream received at a previous symbol time is 1000 and information data bit streams received at a current symbol time are 00, 01, 10 and 11, an STTC code of 20001232 is generated; when an information data bit stream received at a previous symbol time is 1001 and information data bit streams received at a current symbol time are 00, 01, 10 and 11, an STTC code of 22021030 is generated; when an information data bit stream received at a previous symbol time is 1010 and information data bit streams received at a current symbol time are 00, 01, 10 and 11, an STTC code of 01213313 is generated; when an information data bit stream received at a previous symbol time is 1011 and information data bit streams received at a current symbol time are 00, 01, 10 and 11, an STTC code of 03233111 is generated; when an information data bit stream received at a previous symbol time is 1100 and information data bit streams received at a current symbol time are 00, 01, 10 and 11, an STTC code of 32122000 is generated; when an information data bit stream received at a previous symbol time is 1101 and information data bit streams received at a current symbol time are 00, 01, 10 and 11, an STTC code of 30102202 is generated; when an information data bit stream received at a previous symbol time is 1110 and information data bit streams received at a current symbol time are 00, 01, 10 and 11, an STTC code of 13330121 is generated; and when an information data bit stream received at a previous symbol time is 1111 and information data bit streams received at a current symbol time are 00, 01, 10 and 11, an STTC code of 11310323 is generated.

6. An apparatus for generating a space-time trellis code (STTC) for maximizing space-time diversity gain and coding gain in a mobile communication system including at least two transmission antennas, the STTC having an information data bit stream comprised of a number of bits, the apparatus comprising:
a controller for calculating a minimum effective length for each information data bit stream, calculating product distances between information data bit streams having a length equal to the minimum effective length, wherein for each pair of all initial states and all end states for each of the the information data bit streams, initial states are identical to end states, summing reciprocals of the calculated product distances, calculating minimum average product distances by determining a reciprocal of the summation result; and an STTC encoder for receiving the calculated minimum average products distances and generating as an STTC code corresponding to an information data bit stream having a maximum value among the minimum average product distances.

7. The apparatus of claim 6, wherein the controller calculates the minimum average product distance according to the following equation, $$pd_{\delta,avg}^{-1} == \sum_{\text{all incorrect path of } \delta} \prod_{t \in \eta} \|c_t - c_t'\|^{-2}$$

where $pd_{\delta,avg}$ represents a minimum average product distance of the information data bit stream having a minimum effective length $\delta$, $\eta$ represents a set of all t's with $c_t \neq c_t'$, $c_t$ represents a codeword, and $c_t'$ represents a defective codeword.

8. The apparatus of claim 6, wherein the controller is located at the STTC encoder.

9. An apparatus for maximizing space-time diversity gain and coding gain in a mobile communication system including at least two transmission antennas and a space-time trellis code (STTC) encoder, the apparatus comprising:
means for converting an information data bit stream into a plurality of sets of data bits;
a STTC encoder for operating on the plurality of sets of data bits to produce data symbols from the information data bit stream with a maximum value among minimum average product distances between information data bit streams, by calculating a minimum effective length for each information data bit stream, calculating product distances between the information data bit streams, summing reciprocals of the calculated product distances, and calculating minimum average product distances from the summation result;
a modulator to produce modulated data symbols corresponding to an spread spectrum code of the data symbols; and
means to switch the modulated data symbols to each of the at least two transmission antennas.

10. the apparatus of claim 9, wherein when calculating the minimum effective length for each information data bits stream, for each pair of all initial states and all end states for each information data bit stream, initial states are identical to end states.

* * * * *